INVENTOR.
William M. Martin, Jr.
BY

March 6, 1962   W. M. MARTIN, JR   3,023,898
HYDRO-SIZING APPARATUS FOR AGRICULTURAL PRODUCE
Filed Aug. 14, 1958   2 Sheets-Sheet 2

INVENTOR.
William M. Martin, Jr.,
BY

United States Patent Office 3,023,898
Patented Mar. 6, 1962

3,023,898
HYDRO-SIZING APPARATUS FOR AGRICULTURAL PRODUCE
William M. Martin, Jr., 92 E. River Road, Grand Island, N.Y.
Filed Aug. 14, 1958, Ser. No. 755,035
18 Claims. (Cl. 209—82)

The invention embodied herein has this primary function: to separate unsized fruits, vegetables or other agricultural produce, such as apples, oranges, potatoes, tomatoes or eggs into two or more sizes. It is designed to operate with a water or liquid medium and might suitably be used in conjunction with hydro-cooling or hydro-washing operations.

In this invention, sizing is accomplished by a utilization of the principle of the screw. For example a properly rotating flight-screw which is provided with a gradual or stepwise increase in pitch, suitable for the produce to be sized, will force engaged produce entering at the end with the smallest pitches towards the end with the largest pitches. Items of produce will escape along the length of the screw wherever they can fit between the flights. Sizing is accomplished thereby since smaller produce escapes from the parts of the screw with the narrowest pitches, intermediate sizes from the parts with the wider pitches, large sizes from the parts of the screw with the widest pitches.

Units comprised by series of coils can be established which function in a manner similar to the foregoing and which also operate on the screw principle to effect sizing of produce.

Obviously agriculture produce of unlike sizes or shapes would require hydro-sizing apparatus of different dimensions, for optimum operation. Likewise, the coil-units or flight-screw units incorporated in the apparatus would need to be of specific diameter and specific range of pitch for each type of agricultural produce to be sized, when said apparatus is operated under given conditions and rates of operation.

The principle of the invention might more readily be understood by reference to the accompanying drawings. It must be understood that these drawings are for clarification only and must not be construed as a limitation of the scope of the invention.

Figure 4:
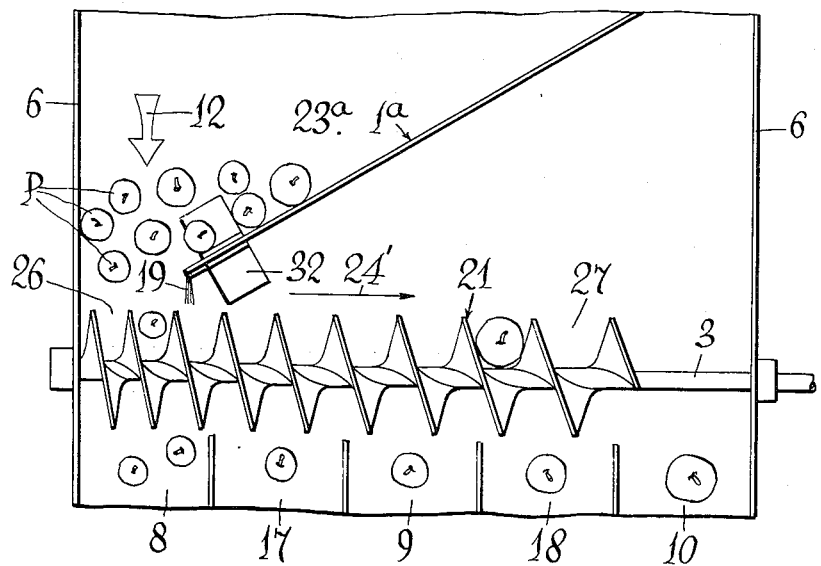

FIGURE 4 is a plan view of a third embodiment of the invention, which indicates the incorporation of a variable-pitch flight-screw as the sizing-unit. In view of the considerable displacement of water laterally, flight-screws would be practical only when revolved slowly. For produce which is susceptible to bruising or injury, and which must consequently be sized slowly, flight-screws and coil-units are equally acceptable as sizing elements. Since either flight screws or coil-units may function equally well under such circumstances, a variable-pitch flight-screw is shown in FIGURE 4 for a clearer presentation of the scope of the invention.

The invention related herein is dependent for its operation on a liquid medium. In consequence, a structure fitted for containing liquid is essential. If it is to be practical from a financial standpoint, however, the hydro-sizing apparatus described cannot be set up as an independent machine, but must be made a part of a continuous processing apparatus, including washing, cooling, sorting and other operations. Because of this, the plan views in FIGURE 1, FIGURE 2, FIGURE 3 and FIGURE 4 show discontinuous structures fitted for containing liquid, the exterior walls 6 of which would form an enclosed tank if extended to include the apparatus requisite for the other processing procedures mentioned. The hydro-sizing apparatus described herein would thus be interposed somewhere in a series of processing operations. In view of this, a description of the invention begins at the top of FIGURE 1, where agricultural produce is taken into the hydro-sizing apparatus from a previous operation.

Figure 1:
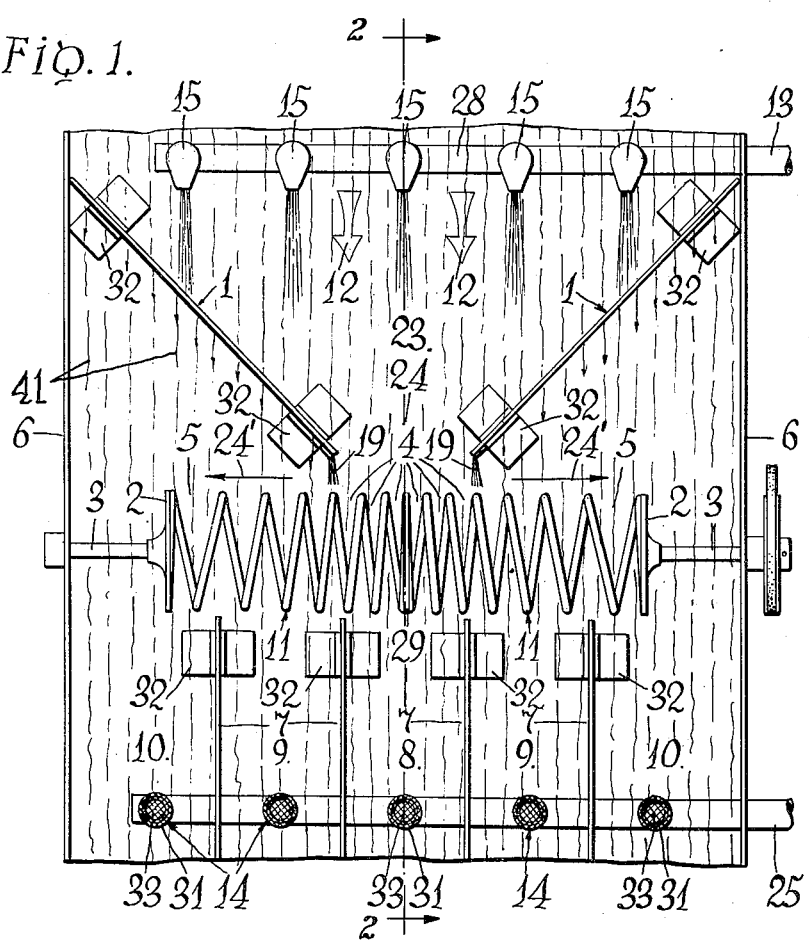
FIGURE 1 is a plan view of one possible embodiment of the invention, showing that portion of a structure fitted to contain liquid (a "tank"), which includes the elements pertinent to the invention.

Beginning at the top of FIGURE 1, unsized agricultural produce is moved into and is accumulated in the intake area 23. From thence it is forced in the general direction of the large arrows 12 by liquid flowing from a circulating pump system 13 into a submerged conduit 28 and out adjustable-volume nozzles 15 toward the adjustable-level over-flow drains 14 which empty the liquid via a horizontal pipe 25 into a sump. From thence, the liquid is returned to said circulating pump system.

This movement of liquid forcibly floats said agricultural produce against the perforated directional guides 1 which direct said agricultural produce through the throat 24 where said agricultural produce is forcibly floated against that part of each coil unit 11 with the narrowest spacing between coils 4. That fraction of the agricultural produce which has sufficiently small contact-diameter is permitted to pass between these coils with the narrowest spacing 4 into the delivery chute for the smallest-size produce 8. The co-axial coil-units 11 continuously rotate as a unit about their common longitudinal axis, turned by the drive shaft 3.

The medium and large fractions of the produce, being too large in contact-diameter to pass between the narrow-spaced coils 4 of said coil-units 11 but being held in intimate contact with said coils by pressure of the general flow of liquid indicated by the large arrows 12, are laterally displaced by rotation of the coil units 11 in the direction of the small arrows 24'. The brushes 19 at the ends of the perforated directional guides 1 permit the produce to pass only in single-file during this lateral displacement.

Beyond the brushes 19, the said medium and large fractions of agricultural produce continue to be forced into intimate contact with the coils of said coil-units as a result of the pressure of liquid flowing from the nozzles 15 through the perforations of the directional guides 1, in the general direction of the large arrows 12.

The medium and large fractions of agricultural produce continue to be displaced laterally by the rotation of the co-axial coil-units 11 in the directions indicated by the small arrows 24', until the spacing between coils is sufficiently wide to permit items of the medium fraction of produce to float through into the delivery chutes for medium-size produce 9.

That fraction of the produce which is too large to pass between the coils with the largest spacing 5 is passed off the ends of the coil units and floats into the two delivery-chutes for largest-size produce 10. The delivery-chute guides 7, adjustable laterally to alter the ranges in sizes of produce accumulated in each delivery-chute, function also to keep the sized agricultural produce separate.

At this stage, the produce is separated into more than two sizes, completing the function of said Hydro-Sizing Apparatus.

Figure 2:
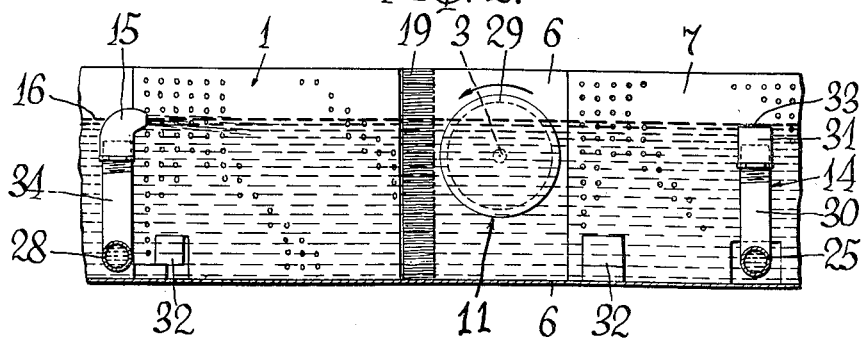
FIGURE 2 is a vertical sectional view of the apparatus shown in FIGURE 1, taken longitudinally and centrally about along line 2—2 of FIGURE 1.
Figure 3:
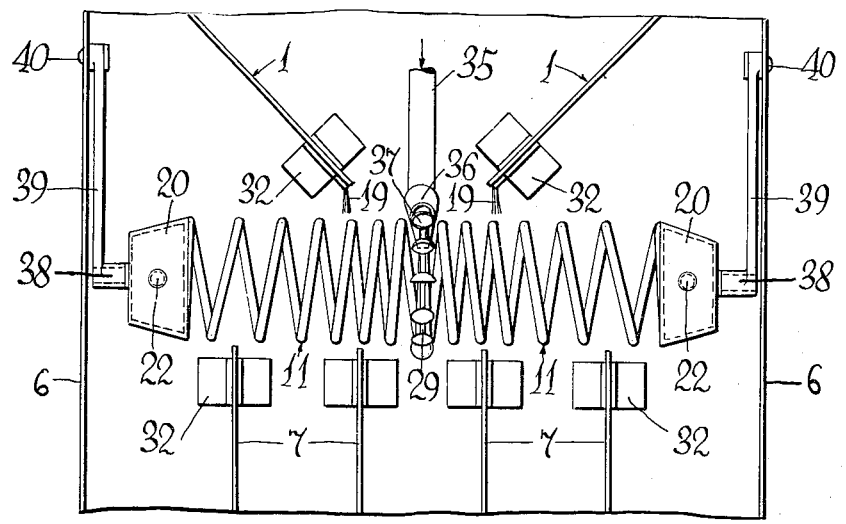
FIGURE 3 is a plan view of a second embodiment of the invention, showing the use of floation chambers to float the sizing coil, with a resulting increase in precision of adjustment of the depth of immersion of said sizing-coil, in the liquid medium.

The sizing-coils 11 shown in FIGURE 1, FIGURE 2 and FIGURE 3 are each comprised of two separate coil-units, wound in directions opposite from each other with their adjacent ends embedded in a molded joining-disk 29 to so align said units in relation to each other that a single, rigid, co-axial entity is formed. The said coil-units thus have a common center-line axis of rotation, indicated in FIGURE 1 by the common-drive-shaft 3. Within each coil-unit there is a continuous series of coils, wound in the same direction. When the sizing-coil is continuously rotated, and appropriate produce is forced into intimate contact with it, each of said units displaces said produce laterally away from the molded joining-disk 29 towards the end-plates 2 (FIG. 1) or buoyancy-chambers 20 (FIG. 3). The sizing- coil must be adapted for rotation in one direction only, with each of the units so wound that the desired lateral displacement results. As indicated in FIGURE 2, the sizing-coil rotates with its topmost parts moving opposite to the flow of liquid 12. The flight-screw 21 indicated in FIGURE 4 rotates in the same direction as the coil units. Said flight-screw comprises a single, rigid unit and is designed to rotate as a unit.

The perforated, directional-guides 1 are indicated in FIGURE 2 with a few perforations shown. The weighted-stands 32 which rest on the bottom of the tank 6 and which are attached to and support the directional guides 1 are indicated by a single example in FIGURE 2. Another such weighted-stand 32 is indicated in the same figure, supporting a delivery-chute guide 7.

In FIGURE 2, an adjustable-volume nozzle 15 is shown supported by a stand-pipe 34. The adjustable-level overflow drain is also shown 14, comprised by a sleeve 31 threaded to screw on the intake end of a vertical drain-pipe 30, which empties into a horizontal conduit 25 leading to a sump. A screen 33 is also indicated, functioning to prevent produce from entering the drain-pipe.

In FIGURE 3, the molded joining-disk 29 which rigidly unites the two coil-units 11 is provided also with cups 37, embedded in the rim of said disk to form a water-wheel. When this apparatus is operational, the said coil-units are floated by the buoyancy-chambers 20, each of which are fitted with valves 22 to permit adjustment of the depth of immersion of said coil-units. The said coil-units are held in position for sizing operations by two arms 39 hinged at points on the side-wall of the tank 40 and provided with bearings 38 which engage the axle of the said coil-units to permit rotation of said coil-units when the apparatus is operational. Drains 14 and nozzles 15 are omitted in FIGURE 3, and FIGURE 4, since the basic relationship involved was established in FIGURE 1. The over-all direction of current flow is the same in FIGURE 3 and FIGURE 4 as was indicated in FIGURE 1 by the large arrows 12 and the wavy flow-lines 41.

In FIGURE 3, the water-wheel made by embedding cups 37 in the molded joining-disk 29 is turned by an adjustable-volume nozzle 36 furnished with liquid under presure by a conduit 35. This arrangement results in a water-wheel of the under-shot type capable of turning said coil-units to effect the sizing of agricultural produce. Said adjustable-volume nozzle 36 must be so positioned that the jet of liquid from it engages the cups 37 to turn said water-wheel.

The brushes 19 shown in all figures must be made of material sufficiently pliable to be supple; the degree of pliability required being predicated by the rates of operation of various parts of the apparatus and by the agricultural produce to be processed. If too supple, produce will tend to pass by said wipers in bunches rather than in single file. If too stiff, said wipers could jam up produce and entirely prevent the normal, lateral displacement of said produce by the sizing-unit.

The indicia used in FIGURE 1 are used also to designate the same structures in FIGURE 2, FIGURE 3, and FIGURE 4. Additional indicia are provided for structures presented in FIGURE 2, FIGURE 3, and FIGURE 4 which are not present in FIGURE 1. Where the structure in FIGURE 3 or FIGURE 4 are similar but not identical with those of FIGURE 1 and FIGURE 2, a small letter is added to the number to indicate the variation of structure.

In FIGURE 2, a vertical sectional view is provided along the central, longitudinal line of FIGURE 1. This view shows said coil-units 11 in operational condition, partially immersed in the liquid medium of the said tank 6 to effectively intercept agricultural produce forced into contact with the coils of said units. The surface-level of said liquid medium 16 is indicated. In FIGURE 2 the drive shaft 3 is shown well below the surface level of the liquid 16, indicating that agricultural produce may readily float above and over said drive shaft 3.

FIGURE 4 shows an embodiment of the invention in which unsized produce P is separated into five sizes by a sizing screw 21. Produce enters in the intake area 23a, is guided by the directional guide 1a and the general flow of current 12 into contact with the flights of the sizing-screw 21 that have the smallest pitch 26. Rotation of said sizing-screw displaces the produce laterally as indicated by the small arrow 24'. Items of produce escape between the flights of said sizing-screw into the delivery-chutes, whenever spacings between flights are greater than the contact-diameter of an item of produce engaged by said flights. A few items of sized produce are indicated in the delivery-chutes of FIGURE 4 to show the results of the sizing process. Also, an item of produce of small size is shown engaged by the flights with the narrowest spacing 26, which item, because of its small contact-diameter is permitted to escape into the "small" delivery-chute 8. At the end of the screw which has larger spacings between flights 27, a large item of produce is shown, displaced laterally by rotation of the screw and, at the indicated position, prevented from escape between the flights due to its large contact-diameter.

The delivery-chutes are designated as follows, by the size of agricultural produce held in each: small 8, medium-small 17, medium 9, medium-large 18 and large 10. The drive-shaft 3 and axle of the flight-screw 21 must be submerged deeply enough when the apparatus in FIGURE 4 is operational, to permit agricultural produce being processed to float over said shaft and axle.

For greater clarity, some aspects of the accompanying drawings shall be further embellished. The perforated directional guides 1 and the delivery-chute guides 7 are conveniently supported by weighted stands 32, which rest on the bottom of the liquid-containing structure 6 as indicated in FIGURE 1, FIGURE 2, and FIGURE 3. Such weighted stands have the advantage of permitting simple and facile adjustment of the guides 1 and brushes 19, as well as lateral adjustments of the delivery-chute guides 7.

No specified sizes of perforations need be designated for the perforated directional guides. However, the perforations must be small enough so as not to become plugged with or permit passage of submerged or floating produce, yet sufficiently large and/or numerous so as not to materially impede the current-flow between the nozzles 15 and the over-flow drains 14.

The adjustable-level over-flow drains 14 each consist of a sleeve threaded to screw on the top of a vertical drain pipe; which said drain-pipe is installed so its top is even with the absolute minimum water-level. By screwing said sleeve up or down on said drain-pipe, minute and accurate adjustments of water-level may be made, to alter flow-rates in different areas of the liquid-containing structure 6 and to alter the liquid surface-level in relation to the coil-units or flight-screw units employed. The proper adjustment of the liquid surface-level in relation to the sizing-units is of critical importance for proper sizing.

Effective interception of floating produce is dependent on proper depth of immersion of the coil-units 11 or flight-screw unit 21 in the liquid medium. In the case of the embodiment of the invention shown in FIGURE 1, the drive-shaft 3 of the coil-units 11 is fixed in relation to the tank 6. Control of the liquid-level in the tank and consequent control of depth of immersion of the coil-units is achieved therefore by screwing up or down the threaded sleeves 31 at the intake ends of the adjustable-level overflow drains 14.

The materials of which the apparatus shown in FIGURE 1, FIGURE 2, FIGURE 3 and FIGURE 4 are constructed, are indicated herein-after. The tanks 6 are constructed of stainless-steel. All plumbing installations are made of stainless-steel. The perforated directional guides 1 and 1a and the delivery-chute guides 7 are constructed of perforated, stainless-steel, with the weighted stands 32 also of stainless-steel. The axle 3 and the end-plates 2 are made of stainless-steel also. The coils of the coil-units 11 are made of stainless-steel, hollow tubing. The brushes 19 are made of rubber sheeting. The flight-screw 21 is of stainless-steel. The joining disk 29 and buoyancy-chambers 20 and plug 22 are made of plastic. The cups 37 are made of stainless-steel. All minor accessory parts such as bolts and nuts are made of stainless steel also. The arms 39, bearings 38, hinge-devices 40 and other such accessories are also made of stainless steel.

The useful-life of the hydro-sizing apparatus herein described is dependent on the resistance to corrosion and deterioration of the elements of which it is constructed. Plastics or metals which are resistant to corrosion in wide range of solutions are desirable therefore as structural materials. Corrosion may be prevented also by coating structural elements of the apparatus with suitable corrosion-resistant materials. Such materials, especially rubberized types, might serve a second purpose: to protect produce from excessive bruising.

A clearer conception of the operation of the invention might be conveyed through and indication of rates of operation of the various parts. The surface flow-rate of the liquid medium contained in the tank 6 must not be so fast that it causes bruising of produce, nor so slow that produce fails to move along the perforated directional guides 1 and 1a or fails to be adequately engaged by the coils or screw-flights during operation.

The surface flow-rate will depend considerably on the type of produce being sized and on the details of construction of the liquid-containing structure 6 and its accessories. Regulation of flow rate is achieved through manipulation of either the adjustable-volume nozzles 15 or the output of the said circulating pump or both. Provision for a surface flow-rate of from 30 to 120 feet per minute should suffice to properly handle most types of agricultural produce without excessive bruising. Because some varieties or some lots within a given kind of produce are more susceptible to bruising than the average, flow-rates which are adjustable rather than fixed are requisite even for machines intended for use with one fruit or vegetable only.

The rate of rotation of the sizing-screw or sizing-coils is primarily dependent on their diameters and on the type of produce being sized. Rotation must be slow enough to avoid significant bruising, yet fast enough for economical operation. A sizing-process which is excessively slow would likely be economically unfeasible. Excessively fast operation might cause mal-function of the apparatus and/or bruising. A range of rotation rates from 30 to 180 revolutions per minute would satisfactorily handle most types of agricultural produce. Tender produce such as peaches and strawberries would require the slower rate, while in the case of potatoes, the maximum rate could be approached.

It will be appreciated that, although the embodiments of FIGS. 1–3 show sizing units or devices comprising oppositely wound, paired coils 11, each helical coil 11 in itself also is a sizing device and should be so considered.

Having thus described my invention, and with the understanding that although specific terms are employed, they are used in a descriptive sense and not for purposes of limitation, the scope of the invention being set forth in the following claims.

I claim:

1. A hydro-sizing apparatus for separating agricultural produce into a plurality of sizes, including in combination: a multiple-pitch sizing-device comprised by an axis integrally united with and supporting helical ribs threaded around it; said sizing-device characterized by a longitudinal progression of magnitudes of pitches, resulting in an entity in which inter-rib spacings gradually increase in size from one end of said sizing-device toward the other end; a tank constructed to contain liquid and fitted with bearings to integrally position the axis of said sizing-device in said tank and to permit axial rotation of said sizing-device in said position.

2. A hydro-sizing apparatus for separating agricultural produce into a plurality of sizes, including in combination: a multiple-pitch sizing-device comprised by an axis integrally united with and supporting helical ribs threaded around it; said sizing-device characterized by a longitudinal progression of magnitudes of pitches, resulting in an entity in which inter-rib spacings gradually increase in size from one end of said sizing-device toward the other end; a tank constructed to contain liquid and fitted with bearings to integrally position the axis of said sizing-device crosswise in said tank to permit axial rotation of said sizing-device in said position, in said tank; flexible wipers, installed in said tank adjacent said sizing-device and in proximity to that part of said sizing-device having the smallest pitches, to effect a raking action against said sizing-device for regulation of passage of produce between said wipers and said sizing-device.

3. A hydro-sizing apparatus for separating agricultural produce into a plurality of sizes, including in combination: a multiple-pitch sizing-device comprised by an axis integrally united with and supporting helical ribs threaded around it; said sizing-device characterized by a longitudinal progression of magnitudes of pitches, resulting in an entity in which inter-rib spacings gradually increase in size the center of said sizing-device toward either end thereof; a tank constructed to contain liquid and fitted with bearings to integrally position the axis of said sizing-device crosswise in said tank to permit axial rotation of said sizing-device in said position, in said tank; directional baffles, erected in said tank with one end of each proximate to that part of said sizing-device having the smallest pitches and extending away from said sizing-device at an angle oblique to the axis of said sizing-device to form a funnel-like structure constricting toward that part of said sizing-device having smallest pitches and serving as guides to direct produce thereagainst.

4. A hydro-sizing apparatus for separating agricultural produce into a plurality of sizes, including in combination: a multiple-pitch sizing-device comprised by an axis integrally united with and supporting helical ribs threaded around it; said sizing-device characterized by a longitudinal progression of magnitudes of pitches, resulting in an entity in which inter-rib spacings gradually increase in size from one end of said sizing-device toward the other end thereof; a tank constructed to contain liquid and fitted with bearings to integrally position the axis of said sizing-device crosswise in said tank to permit axial rotation of said sizing-device in said position, in said tank; said tank being fitted on one side of said sizing-device with ducts for emptying liquid into said tank and fitted on the other side of said sizing-device with drains to remove liquid; said ducts and drains forming a workable combination to create a specific water-level and to establish a directional flow of liquid along said tank, toward and through said sizing-device.

5. A hydro-sizing apparatus for separating agricultural produce into a plurality of sizes, including in combination: a multiple-pitch sizing-device comprised by an axis integrally united with and supporting helical ribs threaded around it; said sizing-device characterized by a longitudinal progression of magnitudes of pitches, resulting in an entity in which inter-rib spacings gradually increase in size from one end of said sizing-device toward the other end; a tank constructed to contain liquid and fitted with bearings to integrally position the axis of said sizing-device crosswise in said tank to permit axial rotation of said sizing-device in said position, in said tank; said sizing-device being further positioned by said bearings on a general level with overflow drains of said tank, thereat, forming an obstruction across the main-flow channel of said tank, for intercepting floating produce.

6. A hydro-sizing apparatus for separating agricultural produce into a plurality of sizes, including in combination: a sizing-device comprising a helix having a plurality of pitches, wherein the magnitude of the pitch progressively increases from one end of the helix to the other; said sizing-device being mounted in a tank, constructed to contain liquid, for rotation of said sizing-device on its longitudinal axis in said tank.

7. A hydro-sizing apparatus for separating agricultural produce into a plurality of sizes, including in combination: a horizontally-extending tank for a flotation medium; a helical sizing-device mounted cross-wise in said tank for rotation on its longitudinal axis, the pitch of said sizing-device progressively increasing in magnitude from one end of the said helical sizing-device to the other end; said sizing-device being mounted in said tank on a general level with overflow drains of said tank, thereat forming an obstruction across the main-flow channel of said tank, for intercepting floating produce.

8. A hydro-sizing apparatus for separating agricultural produce into a plurality of sizes, including in combination: a multiple-pitch helix mounted for rotation in a tank constructed to contain liquid, said helix being characterized by a gradual increase in magnitude of pitch from one end of the helix to the other end, for purposes of sizing; said tank being fitted on one side of said helix with ducts for emptying liquid into said tank and fitted on the other side of said helix with drains to remove liquid, said ducts and drains forming a workable combination to create a specific water-level and to establish a directional flow of liquid along said tank, toward and through said helix.

9. A hydro-sizing apparatus for separating agricultural produce into a plurality of sizes, including in combination: a sizing-device composed of a multiple-pitch helix characterized by a gradual increase in magnitude of pitch from one end of said helix to the other end; said helix being mounted for rotation in a tank constructed to contain liquid, crosswise in said tank; and spray nozzles mounted in said tank on one side of said helix for directing liquid-flow toward said helix.

10. A hydro-sizing apparatus for separating agricultural produce into a plurality of sizes, including in combination: a horizontally-extending tank for a flotation medium having a produce inlet at one end thereof; a helical sizing-device mounted for rotation crosswise in said tank, the pitch of said sizing-device gradually increasing in magnitude from one end thereof to the other end thereof; a plurality of produce outlets disposed along the end of the tank opposite the produce inlet end thereof; said sizing-device being mounted in said tank betwixt the said produce inlet and the said produce outlets.

11. A hydro-sizing apparatus for separating agricultural produce into a plurality of sizes, including in combination: a helical sizing-device characterized by a longitudinal progression of increasing magnitudes of pitches, resulting in an entity in which inter-helical spacings gradually increase in size from centrally of said sizing-device toward either end thereof; said sizing-device being mounted for rotation on its longitudinal axis in a tank constructed to contain liquid.

12. A hydro-sizing apparatus for separating agricultural produce into a plurality of sizes, including in combination: a sizing-device comprising a helix having a plurality of pitches, wherein the magnitude of the pitch progressively increases from one end of the helix to the other end; said sizing-device being mounted in a tank, constructed to contain liquid, for rotation of said sizing-device on its longitudinal axis in said tank; flexible wipers, installed in said tank adjacent said sizing-device and in proximity to that part of the said sizing-device having the smallest pitches, to effect a raking action against said sizing-device for regulation of passage of produce between said wipers and said sizing-device.

13. A hydro-sizing apparatus for separating agricultural produce into a plurality of sizes, including in combination: a horizontally-extending tank constructed to contain a liquid flotation medium; a helical sizing-coil mounted for rotation on its longitudinal axis crosswise in said tank, the pitch of said sizing-coil gradually increasing in magnitude from one end of said sizing-coil to the other end thereof; said tank having a produce inlet disposed on one side of said sizing-coil and a plurality of produce outlets disposed along the other side of said sizing-coil.

14. A hydro-sizing apparatus for separating agricultural produce into a plurality of sizes, including in combination: a horizontally-extending tank constructed to contain a liquid flotation medium; a helical sizing-coil mounted for rotation on its longitudinal axis crosswise in said tank, the pitch of said sizing-coil gradually increasing in magnitude from one end of said sizing-coil to the other end thereof; said tank having a produce inlet disposed on one side of said sizing-coil and a plurality of produce outlets disposed along the other side of said sizing-coil; said tank being fitted on one side of said sizing-coil with ducts for emptying liquid into said tank and being fitted on the other side of said sizing-coil with drains to remove liquid, wherein said ducts and drains form a workable combination to create a specific water-level and to establish a directional flow of liquid along said tank toward and through said sizing-coil.

15. A hydro-sizing apparatus for separating agricultural produce into a plurality of sizes, including in combination: a sizing-device comprised by a multiple-pitch helix having a gradual increase in magnitude of pitch from one end to the other end thereof; said sizing-device being mounted for axial rotation in a horizontally-extending tank constructed to contain a liquid flotation medium; said tank being fitted on one side of said sizing-device with directional guides positioned to form a produce inlet; said tank being fitted with a plurality of delivery guides on that side of said sizing-device opposite the said directional guides.

16. A hydro-sizing apparatus for separating agricultural produce into a plurality of sizes, including in combination: a sizing-device comprised by a multiple-pitch helix having a gradual increase in magnitude of pitch toward one end thereof; said sizing-device being mounted for axial rotation in a horizontally-extending tank constructed to contain a liquid; directional guides on one side of said sizing device forming a produce inlet for directing produce against said sizing device; and a plurality of delivery guides on that side of said sizing-device opposite said directional guides, thereat presenting a plurality of outlets for receiving sized produce from said sizing-device.

17. A hydro-sizing apparatus for separating agricultural produce into a plurality of sizes, including in combination: a horizontally-extending tank constructed to contain a liquid; a helix mounted crosswise in said tank for rotation on a longitudinal axis; said helix being characterized by a gradual increase in magnitude of pitch from one end of said helix to the other end thereof; perforated directional guide means positioned on one side of said helix to form a produce inlet; and a plurality of delivery guides on that side of said helix opposite said directional guides.

18. A hydro-sizing apparatus for separating agricultural produce into a plurality of sizes, including in combination: a horizontally-extending tank constructed to contain a liquid; a helix mounted crosswise in said tank for rotation on a longitudinal axis; said helix being characterized by a gradual increase in magnitude of pitch from one end of the helix to the other end thereof; said tank being fitted on one side of said helix with directional guides positioned to form a produce inlet for directing produce against said helix; said tank being fitted with a plurality of delivery guides on that side of said helix opposite said directional guides, thereat presenting a plurality of outlets for receiving sized produce from said helix; said tank being fitted with ducts and overflow drains; said delivery guides and directional guides positioned in said tank intersecting the level established by the orifices of said ducts and overflow drains.

References Cited in the file of this patent

UNITED STATES PATENTS

| | | |
|---|---|---|
| 1,450,145 | Ellenwood | Mar. 27, 1923 |
| 1,710,208 | Deitz | Apr. 23, 1929 |
| 2,491,912 | Walker | Dec. 20, 1949 |
| 2,609,096 | Bitzer | Sept. 2, 1952 |
| 2,808,928 | Kaufman et al. | Oct. 8, 1957 |